US012353515B2

United States Patent
Ebihara (10) Patent No.: US 12,353,515 B2
(45) Date of Patent: *Jul. 8, 2025

(54) INFORMATION PROCESSING DEVICE, PERSONAL IDENTIFICATION DEVICE, INFORMATION PROCESSING METHOD, AND STORAGE MEDIUM

(71) Applicant: NEC Corporation, Tokyo (JP)

(72) Inventor: Akinori Ebihara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/235,248

(22) Filed: Aug. 17, 2023

(65) Prior Publication Data

US 2023/0401290 A1 Dec. 14, 2023

Related U.S. Application Data

(63) Continuation of application No. 17/439,009, filed as application No. PCT/JP2019/012793 on Mar. 26, 2019.

(51) Int. Cl.
G06F 18/00 (2023.01)
G06F 18/21 (2023.01)
(Continued)

(52) U.S. Cl.
CPC ........ *G06F 18/2415* (2023.01); *G06F 18/217* (2023.01); *G06F 18/2431* (2023.01)

(58) Field of Classification Search
None
See application file for complete search history.

(56) References Cited

U.S. PATENT DOCUMENTS 10,373,024 B2 * 8/2019 Nakamura ............ G06F 18/217
2002/0042692 A1 * 4/2002 Gross ..................... G01R 23/16
702/183

(Continued)

FOREIGN PATENT DOCUMENTS

CN 104246778 A 12/2014
JP 2001-523824 A 11/2001
(Continued)

OTHER PUBLICATIONS

International Search Report for PCT Application No. PCT/JP2019/012793, mailed on Jun. 4, 2019.

(Continued)

*Primary Examiner* — Farhan M Syed (57) ABSTRACT

Provided is an information processing device including: an acquisition unit that sequentially acquires a plurality of elements included in sequential data; a first calculation unit that calculates, for each of the plurality of elements, indicators each indicating which of a plurality of classes is appropriate for corresponding element to belong to, in consideration of two or more elements among the plurality of elements; a second calculation unit that calculates, by integrating the indicators of the plurality of elements, an integrated indicator indicating which of the plurality of classes is appropriate for the sequential data to belong to; and a classification unit that classifies the sequential data into one of the plurality of classes based on the integrated indicator.

9 Claims, 3 Drawing Sheets

(51) Int. Cl.
*G06F 18/2415* (2023.01)
*G06F 18/2431* (2023.01)

(56) References Cited

U.S. PATENT DOCUMENTS

| | | | |
|---|---|---|---|
| 2004/0162685 A1 | 8/2004 | Gross et al. | |
| 2009/0289760 A1* | 11/2009 | Murakami | G06V 40/70 |
| | | | 340/5.82 |
| 2011/0158536 A1* | 6/2011 | Nakano | G06V 40/50 |
| | | | 382/190 |
| 2012/0195475 A1 | 8/2012 | Abiko | |
| 2013/0289757 A1 | 10/2013 | Yoshizumi | |
| 2017/0358045 A1* | 12/2017 | Takeda | G06Q 50/18 |
| 2020/0110980 A1* | 4/2020 | Despiegel | G06F 18/2415 |
| 2020/0364517 A1* | 11/2020 | Nakata | G06N 3/045 |
| 2020/0401855 A1* | 12/2020 | Kim | G06F 18/254 |
| 2020/0410320 A1* | 12/2020 | Almazán | G06N 3/084 |
| 2024/0296329 A1* | 9/2024 | Paik | G06F 18/00 |

FOREIGN PATENT DOCUMENTS

| | | |
|---|---|---|
| JP | 2002-373332 A | 12/2002 |
| JP | 2006-330936 A | 12/2006 |
| JP | 2008-299589 A | 12/2008 |
| JP | 2009-245314 A | 10/2009 |
| JP | 2009-289253 A | 12/2009 |
| JP | 2011-138387 A | 7/2011 |
| JP | 2011-218090 A | 11/2011 |
| JP | 2011-227546 A | 11/2011 |
| JP | 2017-117025 A | 6/2017 |
| WO | 2009/096208 A1 | 8/2009 |
| WO | 2016/125310 A1 | 8/2016 |

OTHER PUBLICATIONS

English translation of Written opinion for PCT Application No. PCT/JP2019/012793, mailed on Jun. 4, 2019.
Extended European Search Report for EP Application No. EP19921882.7 dated on Mar. 15, 2022.
Diyan Teng et al: "Wald-Kernel: Learning to Aggregate Information for Sequential Inference", Aug. 31, 2015 (Aug. 31, 2015).
Sochman J et al: "WaldBoost—Learning for Time Constrained Sequential Detection", Proceedings / 2005 IEEE Computer Society Conference on Computer Vision and Pattern Recognition, CVPR 2005 : [Jun. 20-25, 2005, San Diego, CA], IEEE, Piscataway, NJ, USA, vol. 2, Jun. 20, 2005 (Jun. 20, 2005).
Laitrakun Seksan et al: "Adaptive reliability-based splitting algorithms for ordered sequential detection in WSNs", 2014 IEEE 25th Annual International Symposium On Personal, Indoor, and Mobile Radio Communication (PIMRC), IEEE, Sep. 2, 2014 (Sep. 2, 2014).
Gao Yongxin et al: "Tracking-aided target classification using multi-hypothesis sequential test", 17th International Conference on Information Fusion (Fusion), International Society of Information Fusion, Jul. 7, 2014 (Jul. 7, 2014).
Jay Bartroff et al: "Modern Sequential Analysis and Its Applications to Computerized Adaptive Testing", Psychometrika, Kluwer Academic Publishers-Plenum Publishers, NE, vol. 73, No. 3, Jan. 4, 2008 (Jan. 4, 2008).
Murakami T et al: "Accuracy improvement with high convenience in biometric identification using multihypothesis sequential probability ratio test", Information Forensics and Security, 2009. WIFS 2009. First IEEE International Workshop on, IEEE, Piscataway, NJ, USA, Dec. 6, 2009 (2009-12-06).
CN Office Action for CN Application No. 201980094592.9, mailed on Jan. 11, 2025 with English Translation.
US Office Action for U.S. Appl. No. 17/439,009, mailed on Sep. 13, 2024.

\* cited by examiner

INFORMATION PROCESSING DEVICE, PERSONAL IDENTIFICATION DEVICE, INFORMATION PROCESSING METHOD, AND STORAGE MEDIUM

This application is a Continuation of U.S. application Ser. No. 17/439,009 filed on Sep. 14, 2021, which is a National Stage Entry of PCT/JP2019/012793 filed on Mar. 26, 2019, the contents of all of which are incorporated herein by reference, in their entirety.

TECHNICAL FIELD

The some non-limiting embodiments relate to an information processing device, a personal identification device, an information processing method, and a storage medium.

BACKGROUND ART

Patent Literatures 1 to 3 disclose information processing techniques using a sequential probability ratio test (SPRT). SPRT is a kind of method of determining which of a plurality of predetermined classes a sequential data input sequentially belongs to.

CITATION LIST

Patent Literature

PTL 1: Japanese Patent Application Laid-open No. 2009-245314
PTL 2: Japanese Patent Application Laid-open No. 2008-299589
PTL 3: Japanese Patent Application Laid-open No. 2001-523824

SUMMARY

Technical Problem

In the mathematical formula used for SPRT as disclosed in Patent Literatures 1 to 3, it is assumed that each element of the sequential data is a random variable is independently and identically distributed (i.i.d.). Therefore, since the SPRT does not consider the relationship between elements of the sequential data, sufficient accuracy may not be obtained depending on the nature of the sequential data.

An example object of the some non-limiting embodiments is to provide an information processing device, a personal identification device, an information processing method, and a storage medium capable of accurately classifying sequential data.

Solution to Problem

According to one example aspect of the some non-limiting embodiments, provided is an information processing device including: an acquisition unit that sequentially acquires a plurality of elements included in sequential data; a first calculation unit that calculates, for each of the plurality of elements, indicators each indicating which of a plurality of classes is appropriate for corresponding element to belong to, in consideration of two or more elements among the plurality of elements; a second calculation unit that calculates, by integrating the indicators of the plurality of elements, an integrated indicator indicating which of the plurality of classes is appropriate for the sequential data to belong to; and a classification unit that classifies the sequential data into one of the plurality of classes based on the integrated indicator.

According to another example aspect of the some non-limiting embodiments, provided is an information processing method including: sequentially acquiring a plurality of elements included in sequential data; calculating, for each of the plurality of elements, indicators each indicating which of a plurality of classes is appropriate for corresponding element to belong to, in consideration of two or more elements among the plurality of elements; calculating, by integrating the indicators of the plurality of elements, an integrated indicator indicating which of the plurality of classes is appropriate for the sequential data to belong to; and classifying the sequential data into one of the plurality of classes based on the integrated indicator.

According to yet another example aspect of the some non-limiting embodiments, provided is a storage medium storing a program that causes a computer to perform an information processing method, the information processing method comprising: sequentially acquiring a plurality of elements included in sequential data; calculating, for each of the plurality of elements, indicators each indicating which of a plurality of classes is appropriate for corresponding element to belong to, in consideration of two or more elements among the plurality of elements; calculating, by integrating the indicators of the plurality of elements, an integrated indicator indicating which of the plurality of classes is appropriate for the sequential data to belong to; and classifying the sequential data into one of the plurality of classes based on the integrated indicator.

Advantageous Effects

According to the some non-limiting embodiments, it is possible to provide an information processing device, a personal identification device, an information processing method, and a storage medium capable of accurately classifying sequential data.

DESCRIPTION OF EMBODIMENTS

Example embodiments of the some non-limiting embodiments will be described below with reference to the drawings. Throughout the drawings, the same components or corresponding components are labeled with same references, and the description thereof may be omitted or simplified.

First Example Embodiment

A sequential data classification system according to the present example embodiment will be described. The sequential data classification system of the present example embodiment is a system for classifying sequential data into one of a plurality of predetermined classes by sequentially acquiring and analyzing a plurality of elements included in the sequential data.

Here, the sequential data means a data sequence that can be decomposed into a plurality of elements. The sequential data may be time-series data or non-time-series data. Specific examples of the time-series data include moving image data and audio data. Specific examples of the non-time-series data include vegetation data sampled from a plurality of locations, inspection data of a plurality of portions of a product, and a plurality of biometric data for biometric authentication. When the sequential data is moving image data, the plurality of elements included in the sequential data may be a plurality of images (frames) constituting the moving image. When the sequential data is inspection data of a plurality of portions of a product, the plurality of elements included in the sequential data may be inspection data of each portion of the product. Note that sequential data and elements to which classification processing of the present example embodiment can be applied are not limited to these.

When the sequential data is inspection data of a plurality of portions of a product, the class classified by the sequential data classification system of the present example embodiment may be, for example, a first class indicating that the product is a non-defective product and a second class indicating that the product is a defective product. When the sequential data is a plurality of biometric data for biometric authentication, the class classified by the sequential data classification system of the present example embodiment may be, for example, a first class indicating that the authentication target person is the same person as the target person, and a second class indicating that they are not the same person. The number of classes may be three or more.

Figure 1:
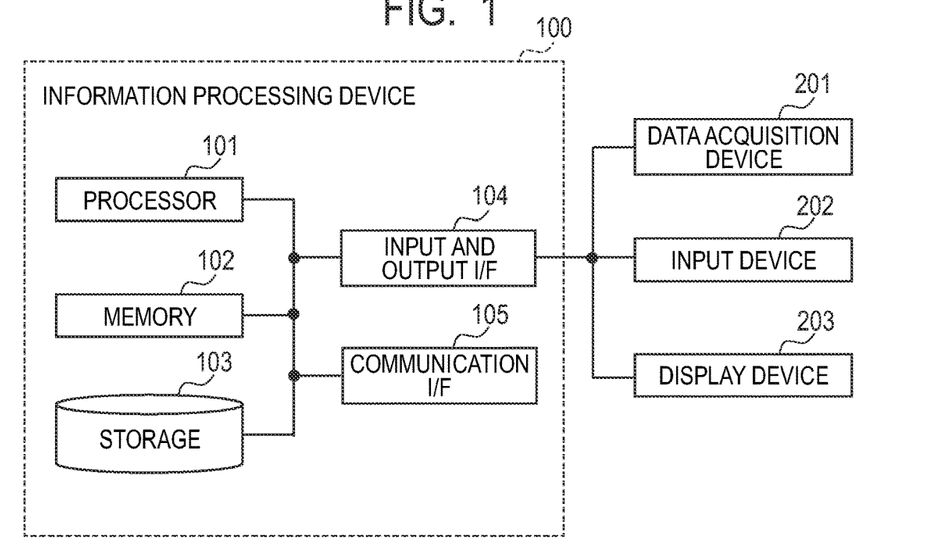
FIG. 1 is a schematic diagram illustrating an overall configuration of a sequential data classification system according to a first example embodiment.

FIG. 1 is a schematic diagram illustrating an overall configuration of a sequential data classification system according to the present example embodiment. FIG. 1 illustrates a hardware configuration included in the sequential data classification system. The sequential data classification system includes an information processing device 100, a data acquisition device 201, an input device 202, and a display device 203.

The information processing device 100 is a computer such as a cellular phone, a smartphone, a desktop personal computer (PC), a laptop PC, or a server. The information processing device 100 includes a processor 101, a memory 102, a storage 103, an input and output interface (I/F) 104, and a communication I/F 105. The units of the information processing device 100 are mutually connected via a bus, wiring, driving device, and the like, and can mutually transmit and receive control signals and data.

The processor 101 is, for example, an arithmetic processing device such as a central processing unit (CPU) or a graphics processing unit (GPU). The memory 102 is a volatile or non-volatile storage medium such as a random access memory (RAM) or a read only memory (ROM). The storage 103 is a non-volatile storage medium such as a hard disk drive (HDD), a solid state drive (SSD), or a memory card.

The memory 102 or the storage 103 stores a program for realizing an information processing function of the information processing device 100. When executing the above-described program, the processor 101 may read the program into the memory 102 and then execute the program, or may execute the program without reading the program into the memory 102.

The above-described program may be stored using various types of non-transitory computer-readable media and supplied to the information processing device 100. Non-transitory computer-readable media include storage media in various types of forms. Non-transitory computer-readable media include, for example, a magnetic storage medium, a magneto-optical storage medium, an optical storage medium, and a semiconductor memory.

Examples of the magnetic storage medium include a flexible disk, a magnetic tape, and a hard disk drive. Examples of magneto-optical storage media include a magneto-optical disk. Example of an optical storage medium are compact disc read only memory (CD-ROM), compact disc recordable (CD-R), and compact disc rewritable (CD-R/W). Examples of the semiconductor memory include a mask ROM, a programmable ROM (PROM), an erasable PROM (EPROM), a flash ROM, and a RAM.

Alternatively, the program may be supplied to the information processing device 100 via various types of transitory computer-readable media. Transitory computer-readable media include, for example, electrical signals, optical signals, and electromagnetic waves. The transitory computer-readable media may supply the program to the information processing device 100 via a wired communication path such as an electric wire or an optical fiber or a wireless communication path.

The input and output I/F 104 is a communication interface for communicating with peripheral devices based on standards such as universal serial bus (USB) and digital visual interface (DVI). The input and output I/F 104 can perform wired or wireless communication connection with the data acquisition device 201, the input device 202, and the display device 203. Thus, the information processing device 100 can transmit and receive data and control signals to and from the data acquisition device 201, the input device 202, and the display device 203.

The communication I/F 105 is a communication interface based on a standard such as Bluetooth (registered trademark), Wi-Fi (registered trademark), or 4G. The communication I/F 105 can perform a wired or wireless communication connection to an external device. Thus, the information processing device 100 can transmit and receive data to and from an external apparatus.

The data acquisition device 201 is a device for acquiring sequential data. For example, when the sequential data is inspection data of a product, the data acquisition device 201 may be an inspection device provided in a factory or the like. For example, when the sequential data is biometric data for biometric authentication, the data acquisition device 201 may be a device for acquiring biometric information such as a digital camera, a microphone, or a fingerprint collection scanner. When the data acquisition device 201 includes a device such as a sensor that acquires an analog signal, the data acquisition device 201 may include an analog-to-digital conversion (AD conversion) device that converts the analog signal into digital data. The sequential data acquired by the data acquisition device 201 is input to the information processing device 100.

The input device 202 is a user interface for receiving an operation of the information processing device 100 by a user. Examples of the input device 202 include a keyboard, a mouse, a trackball, a touch sensor, a pen tablet, a button, and the like. The display device 203 is a device that displays a screen based on drawing data processed by the processor 101. Examples of the display device 203 include a liquid crystal display (LCD), a cathode ray tube (CRT) display, and an organic light emitting diode (OLED) display. The input device 202 and the display device 203 may be integrally formed as a touch panel.

Note that the hardware configuration illustrated in FIG. 1 is an example, and other devices may be added or some of the devices may not be provided. Further, some devices may be replaced by other devices having similar functions. Further, some functions of the present example embodiment may be provided by another device via a network, or the functions of the present example embodiment may be implemented by being distributed among a plurality of devices. For example, the storage 103 may be replaced by a cloud storage external to the information processing device 100. When the acquisition of the sequential data is performed in a system different from the sequential data classification system, the data acquisition device 201 may be omitted. Alternatively, the data acquisition device 201, the input device 202, or the display device 203 may be provided in the information processing device 100. Thus, the hardware configuration illustrated in FIG. 1 can be changed as appropriate.

Figure 2:
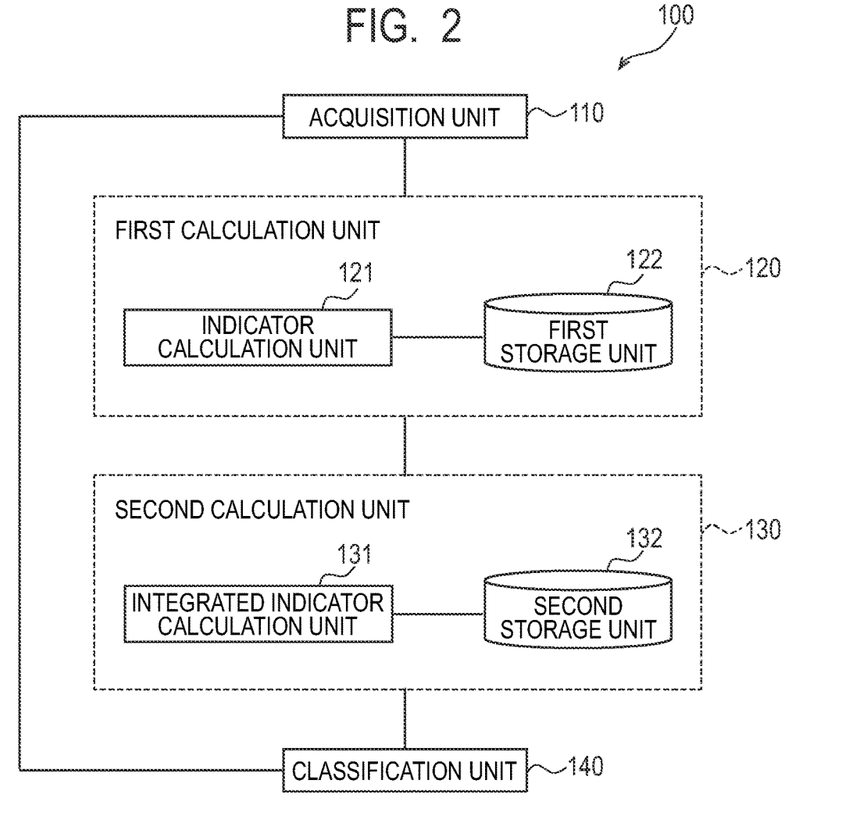
FIG. 2 is a functional block diagram of an information processing device according to the first example embodiment.

FIG. 2 is a functional block diagram of the information processing device 100 according to the present example embodiment. The information processing device 100 includes an acquisition unit 110, a first calculation unit 120, a second calculation unit 130, and a classification unit 140. The first calculation unit 120 includes an indicator calculation unit 121 and a first storage unit 122. The second calculation unit 130 includes an integrated indicator calculation unit 131 and a second storage unit 132.

The processor 101 realizes the functions of the acquisition unit 110, the indicator calculation unit 121, the integrated indicator calculation unit 131, and the classification unit 140 by executing a program stored in the memory 102, the storage 103, or the like. Further, the processor 101 realizes the functions of the first storage unit 122 and the second storage unit 132 by controlling the storage 103 based on the program. Specific processes performed by these units will be described later.

Figure 3:
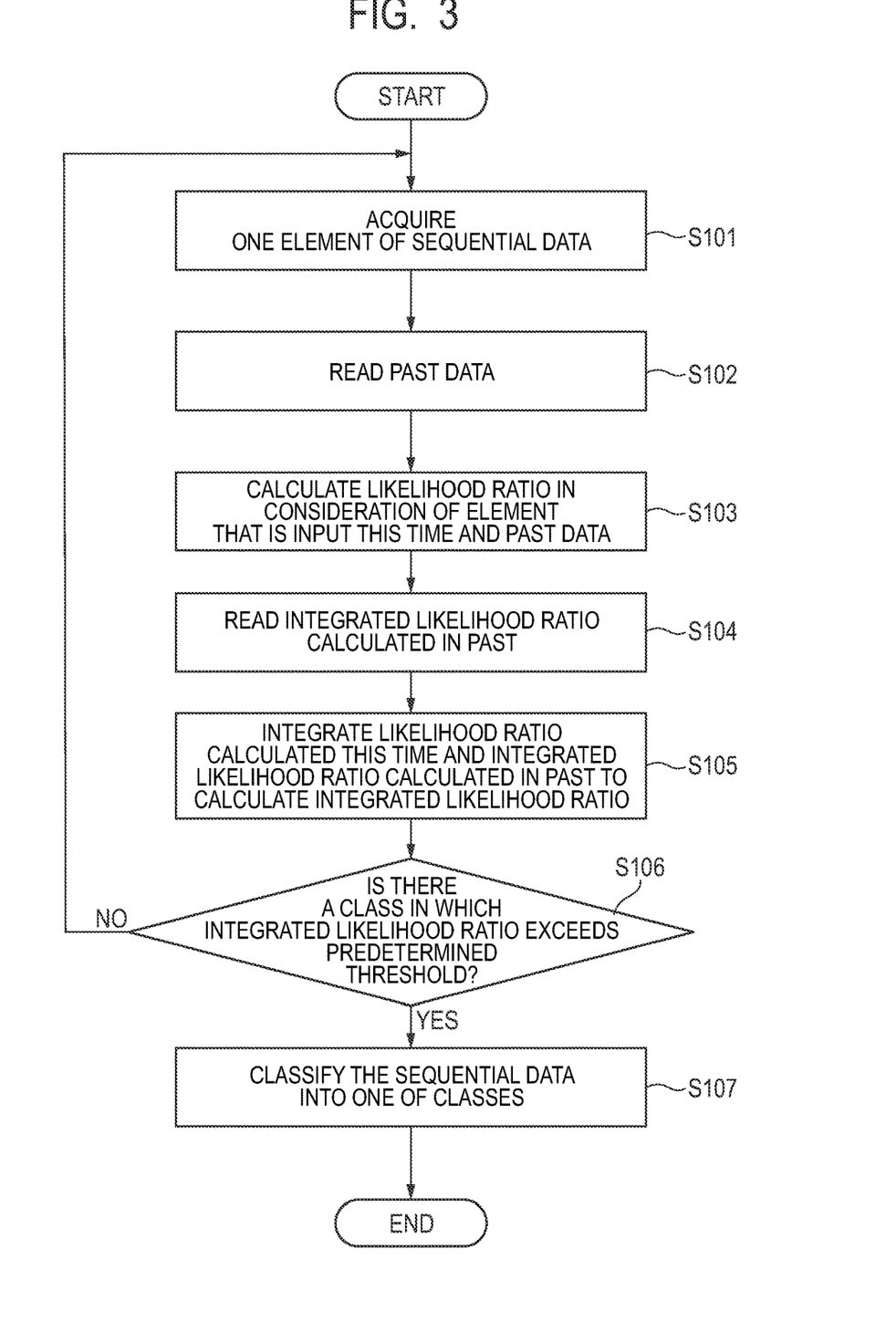
FIG. 3 is a flowchart illustrating an example of personal identification processing performed by the information processing device according to the first example embodiment.

FIG. 3 is a flowchart illustrating an example of classification processing performed by the information processing device 100 according to the present example embodiment. The classification processing illustrated in FIG. 3 is a process of classifying input sequential data into one of a plurality of predetermined classes. The classification processing of FIG. 3 includes a loop process (steps S101 to S106) in which elements are acquired one by one from sequential data including a plurality of elements and an integrated indicator is sequentially calculated. This loop process is repeated until the class of the classification destination of the sequential data is determined based on the integrated indicator (integrated likelihood ratio).

The process of FIG. 3 may be started, for example, when a predetermined user operation is performed on the input device 202. However, the start timing of the process is not limited to this. For example, the process of FIG. 3 may be executed when the sequential data is input from the data acquisition device 201. When sequential data is continuously input as in the case where the data acquisition device 201 is a surveillance camera, the process of FIG. 3 may be repeatedly executed at predetermined time intervals.

In step S101, the acquisition unit 110 acquires one element of the sequential data. The acquisition processing at this time may be a process of directly acquiring data from the data acquisition device 201, or a process of reading out data acquired from the data acquisition device 201 and stored in the storage 103 or the like in advance.

In step S102, the indicator calculation unit 121 reads the past data stored in the first storage unit 122. The past data means, when the current processing is processing for the j-th element in the sequential data, a processing result of the indicator calculation unit 121 for an element before the j-th element in the sequential data. Alternatively, the past data may be an element itself input before the j-th data. The first storage unit 122 stores the processing result or the input element every time the indicator calculation unit 121 performs the processing. In this storage process, new information may be overwritten on information stored in the past, or new information may be added while leaving information stored in the past.

In step S103, the indicator calculation unit 121 calculates, in consideration of two or more elements among the plurality of elements included in the sequential data, an indicator indicating which of the plurality of classes is appropriate for the input element to belong to. The two or more elements include the input element and a previously processed element included in the past data. The first calculation unit 120 outputs the calculated indicator to the second calculation unit 130, and stores the processing result in the first storage unit 122 as necessary. Here, the indicator may be, for example, a likelihood ratio indicating likelihood that a certain element belongs to a certain class among a plurality of classes. Alternatively, the indicator may be a function including the likelihood ratio as a variable. In the following description, the indicator is assumed to be the likelihood ratio.

The indicator calculation unit 121 extracts a feature from the element input from the sequential data. At this time, the indicator calculation unit 121 performs feature extraction in consideration of the relationship between the input element and the past data. As a specific method of feature extraction, for example, a convolutional neural network (CNN) may be used, but the method is not limited thereto. As a specific method of storing past data and calculating the relationship with current input data, for example, a long short term memory (LSTM) may be used, but the method is not limited thereto.

A specific example of the likelihood ratio will be described. The N elements constituting the sequential data are expressed as $x_1, \ldots, x_N$, and the plurality of classes are expressed as $C_1, C_2$. That is, in this example, for simplicity, it is assumed that the classification is two class classification in which the number of classes is two. Here, a calculation result of a probability that the element $x_i$ belongs to the class $C_1$, without considering the past data in the calculation, is expressed as $p(x_i|C_1)$. Also, a calculation result of a probability that the element $x_i$ belongs to the class $C_2$, without considering the past data in the calculation, is expressed as $p(x_i|C_2)$. In this case, a likelihood ratio of these is expressed by the following expression (1).

[Math. 1]
$$\frac{p(x_i|C_1)}{p(x_i|C_2)} \qquad (1)$$

The likelihood ratio of expression (1) indicates the ratio of likelihood between the probability that the element $x_i$ belongs to the class $C_1$ and the probability that the element $x_i$ belongs to the class $C_2$. For example, when the likelihood ratio exceeds 1, since $p(x_i|C_1) > p(x_i|C_2)$, it is appropriate to classify the element $x_i$ into the class $C_1$ rather than the class $C_2$. As described above, the likelihood ratio of expression (1) functions as an indicator indicating which of the class $C_1$ and the class $C_2$ is appropriate for the input element to belong to.

In addition, the indicator calculation unit 121 can calculate the indicator in consideration of a plurality of elements, that is, a relationship between the input element and past data, as described above. In this case, for example, the likelihood ratio calculated in consideration of the two elements $x_i$ and $x_{i-1}$ is expressed by the following expression (2).

[Math. 2]
$$\frac{p(x_i, x_{i-1}|C_1)}{p(x_i, x_{i-1}|C_2)} \qquad (2)$$

In step S104, the integrated indicator calculation unit 131 reads the integrated indicator calculated in the past from the second storage unit 132. In step S105, the integrated indicator calculation unit 131 integrates the likelihood ratio calculated this time by the indicator calculation unit 121 and the integrated indicator calculated in the past to calculate a new integrated indicator. The second calculation unit 130 outputs the calculated integrated indicator to the classification unit 140 and stores the integrated indicator in the second storage unit 132.

The integrated indicator indicates which of the plurality of classes is appropriate for the entire sequential data to belong to. The past integrated indicator means, when the current processing is a processing for the j-th element in the sequential data, an integrated indicator calculated by the integrated indicator calculation unit 131 for an element before the j-th element in the sequential data. The second storage unit 132 stores the integrated indicator every time the integrated indicator calculation unit 131 performs processing. In this storage processing, the value of the integrated indicator may be updated by overwriting the integrated indicator stored in the past with a new integrated indicator, or a new integrated indicator may be added while leaving the integrated indicator stored in the past.

The integrated indicator may be, for example, an integrated likelihood ratio indicating likelihood that the sequential data belongs to a certain class of the plurality of classes. Alternatively, the integrated indicator may be a function including the integrated likelihood ratio as a variable. In the following description, the integrated indicator is the integrated likelihood ratio.

Assuming that the number of classes is 2, a specific example of the integrated likelihood ratio will be described. When N elements are input at the time of calculating the integrated likelihood ratio, the N elements are expressed as $x_1, \ldots, x_N$. Here, the probability that the entire sequential data belongs to the class $C_1$ is expressed as $p(x_1, \ldots, x_N|C1)$. The probability that the entire sequential data belongs to the class $C_2$ is expressed as $p(x_1, \ldots, x_N|C_2)$. In this case, a likelihood ratio of these is expressed by the following expression (3). Expression (3) is called the integrated likelihood ratio.

[Math. 3]
$$\frac{p(x_1, \ldots, x_N|C_1)}{p(x_1, \ldots, x_N|C_2)} \qquad (3)$$

When it is assumed that each element of the sequential data is independent as in a conventional SPRT, the integrated likelihood ratio can be calculated by decomposing it into terms for each element as expressed in the following expression (4). In expression (4), for simplicity of calculation, each element is decomposed into a sum by using a logarithm of the likelihood ratio, but this is not essential. In this specification, the terms likelihood ratio or integrated likelihood ratio may be used for log-likelihood ratios. In addition, although notation of the logarithm base is omitted in this specification, the base may be any value.

[Math. 4]
$$\log\left[\frac{p(x_1, \ldots, x_N|C_1)}{p(x_1, \ldots, x_N|C_2)}\right] = \sum_{i=1}^{N} \log\left[\frac{p(x_i|C_1)}{p(x_i|C_2)}\right] \qquad (4)$$

However, as described above, in the present example embodiment, since the likelihood ratio and the integrated likelihood ratio are calculated in consideration of two or more elements, the assumption that each element is independent is often not satisfied. Therefore, it is not possible to decompose the integrated likelihood ratio into terms for each element as in expression (4), and the integrated likelihood ratio is calculated by different calculation expressions depending on the number of elements in consideration of the relationship.

For example, in the case where two elements, which are an element of the current process and an element immediately preceding the element, are considered, the integrated likelihood ratio can be calculated using the following expression (5).

[Math. 5]
$$\log\left[\frac{p(x_1, \ldots, x_N|C_1)}{p(x_1, \ldots, x_N|C_2)}\right] = \sum_{i=2}^{N} \log\left[\frac{p(x_i, x_{i-1}|C_1)}{p(x_i, x_{i-1}|C_2)}\right] - \sum_{i=2}^{N-1} \log\left[\frac{p(x_i|C_1)}{p(x_i|C_2)}\right] \qquad (5)$$

In the case where three elements, which are the element of the current process and two elements preceding the element, are considered, the integrated likelihood ratio can be calculated using the following expression (6).

[Math. 6]
$$\log\left[\frac{p(x_1, \ldots, x_N|C_1)}{p(x_1, \ldots, x_N|C_2)}\right] = \sum_{i=3}^{N} \log\left[\frac{p(x_i, x_{i-1}, x_{i-2}|C_1)}{p(x_i, x_{i-1}, x_{i-2}|C_2)}\right] - \sum_{i=3}^{N-1} \log\left[\frac{p(x_i, x_{i-1}|C_1)}{p(x_i, x_{i-1}|C_2)}\right] \qquad (6)$$

Note that the likelihood ratio previously calculated by the indicator calculation unit 121 in consideration of two or three elements in step S103 can be used as the terms on the right side expressed in expression (5) and (6).

Expressions (5) and (6) express examples of a case of two-class classification in which the likelihood ratio between the class $C_1$ and the class $C_2$ is calculated, but the number of classes may be three or more. For example, when the number of classes is M, the right side of expression (5) can be extended so that the integrated likelihood ratio between the k-th class and all classes other than the k-th class among the M classes can be calculated. An example of such extension is one using the maximum likelihood of all classes other than the k-th class as in the following expression (7).

[Math. 7]
$$\sum_{i=2}^{N}\log\left[\frac{p(x_i, x_{i-1}|C_k)}{\max_{j\neq k}p(x_i, x_{i-1}|C_j)}\right] - \sum_{i=2}^{N-1}\log\left[\frac{p(x_i|C_k)}{\max_{j\neq k}p(x_i|C_j)}\right] \quad (7)$$

As another example, the sum of likelihoods of all classes other than the k-th class is used as in the following expression (8). Note that the method of calculating the integrated likelihood ratio when the number of classes is three or more is not limited thereto.

[Math. 8]
$$\sum_{i=2}^{N}\log\left[\frac{p(x_i, x_{i-1}|C_k)}{\sum_{j\neq k}^{M}p(x_i, x_{i-1}|C_j)}\right] - \sum_{i=2}^{N-1}\log\left[\frac{p(x_i|C_k)}{\sum_{j\neq k}^{M}p(x_i|C_j)}\right] \quad (8)$$

Expressions (5) to (8) illustrate the case where two or three elements are considered, but four or more elements may be considered. In this case, the integrated likelihood ratio can be calculated by extending expressions (5) to (8) by the same method.

The method of calculating the integrated indicator is not limited to that described above. For example, the integrated indicator may be calculated by a method using LSTM or a deep neural network.

In step S106, the classification unit 140 determines whether or not the sequential data can be classified into any class based on the integrated indicator calculated by the second calculation unit 130. When the integrated indicator is the integrated likelihood ratio, the classification unit 140 determines whether or not classification of a class is possible based on, for example, whether or not there is a class in which the integrated likelihood ratio exceeds a predetermined threshold. If classification is not possible (NO in step S106), the process proceeds to step S101, and the acquisition unit 110 acquires the next element. If classification is possible (YES in step S106), the process proceeds to step S107.

In step S107, the classification unit 140 classifies the sequential data into one of the classes based on the integrated indicator. For example, when the integrated indicator is an integrated likelihood ratio, the sequential data is classified as belonging to a class in which the integrated likelihood ratio exceeds a predetermined threshold.

The processing in steps S106 and S107 will be described in more detail with reference to a specific example. It is assumed that the classification processing in this example is two class classifications into the class $C_1$ or the class $C_2$, and thresholds used for determination of the class C1 and the class $C_2$ are $T_1$ and $T_2$, respectively. Let $L_1$ be the integrated likelihood ratio for the class C1, and $L_2$ be the integrated likelihood ratio for the class $C_2$. When the integrated likelihood ratio is defined by expression (4), since $L_2=-L_1$, substantially only $L_1$ may be calculated.

In this case, when $L_1>T_1$, the classification unit 140 classifies the sequential data into the class $C_1$, and the process ends. When $L_2>T_2$, the classification unit 140 classifies the sequential data into the class C2, and the process ends. When $L_1\leq T_1$ and $L_2\leq T_2$, the classification unit 140 determines that classification is not possible, and the acquisition unit 110 acquires the next element.

When the number of classes is M that is three or more, M thresholds are prepared in the similar manner as described above, and a similar classification process can be performed by determining the magnitude relation between each of the M integrated likelihood ratios and a corresponding threshold. At this time, the classification unit 140 classifies the sequential data into a class in which the integrated likelihood ratio first exceeds the threshold. When the integrated likelihood ratio does not exceed any threshold, the classification unit 140 determines that classification is not possible, and the acquisition unit 110 acquires the next element.

The classification method described above is an example and is not limited thereto. For example, when the number of elements input in steps S106 and S107 is greater than a predetermined value (the maximum number of elements), the sequential data may be forcibly classified into any one of the classes even if there is no class in which the integrated likelihood ratio exceeds the threshold, and the process may be terminated. This can prevent the calculation time from becoming excessively long. In this example, it is desirable that the determination criteria be mutually exclusive so as to be reliably classified into any class.

Specific examples of mutually exclusive criteria will be described. In the case of two-class classification, when the number of elements exceeds the maximum number of elements, it is possible to use a method of classifying the sequential data into one of two classes depending on whether the value of the integrated likelihood ratio $L_1$ is 0 or more. In the case of M class classification, it is possible to use a method of classifying the sequential data into a class having the maximum value among the overall likelihood ratios corresponding to the respective classes.

As described above, according to the present example embodiment, classification of sequential data is performed using the integrated indicator in which a plurality of elements of sequential data are considered. Thus, classification in which the relationship between elements is taken into consideration can be performed, so that the information processing device 100 capable of accurately classifying sequential data is provided.

Classification processing in the information processing device 100 according to the present example embodiment is more effective when the correlation between elements of sequential data is strong. In SPRT as disclosed in Patent Literatures 1 to 3, since an algorithm in which the relationship between elements of sequential data is not taken into consideration is used as in expression (4), classification is performed on sequential data having actually strong relationship between elements as having no relationship between elements. Therefore, the classification accuracy may deteriorate with respect to the sequential data having strong relationship between elements. On the other hand, in the classification processing in the information processing device 100 of the present example embodiment, since the relationship between elements of the sequential data is taken into consideration as in expressions (5) to (8), the classification accuracy is unlikely to deteriorate even for the sequential data having strong relationship between elements.

Specific examples of the case where the correlation between elements of sequential data is strong include time-series data such as moving image data. For example, in moving image data, generally, one frame and the next frame often have similar features. Therefore, the classification processing in the information processing device 100 of the present example embodiment is more effective in the processing of time-series data.

Second Example Embodiment

In the present example embodiment, a personal identification device 300 will be described as an application example of the information processing device 100 according to the first example embodiment. Hereinafter, differences from the first example embodiment will be mainly described, and description of common portions will be omitted or simplified.

Figure 4:
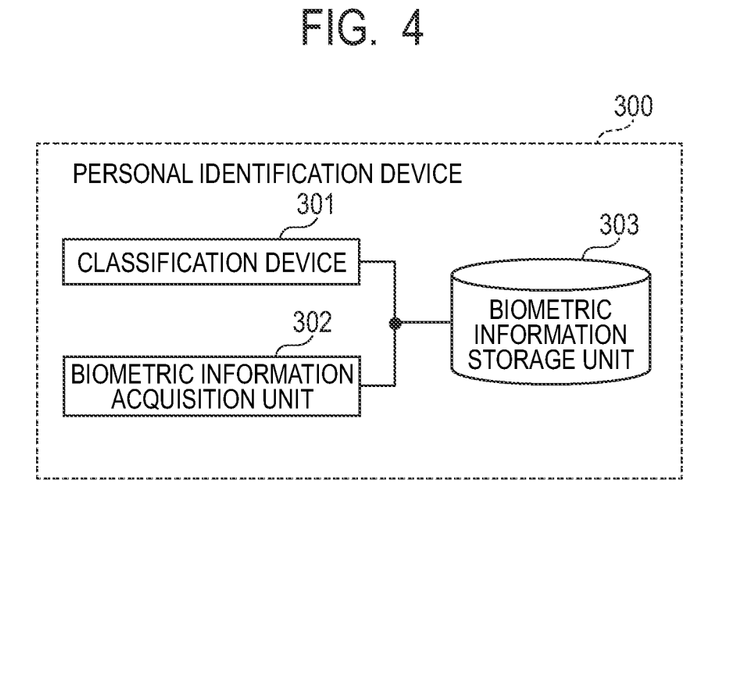
FIG. 4 is a functional block diagram of a personal identification device according to a second example embodiment.

FIG. 4 is a functional block diagram of the personal identification device 300 according to the second example embodiment. The personal identification device 300 includes a classification device 301, a biometric information acquisition unit 302, and a biometric information storage unit 303. The personal identification device 300 may include a computer similar to the information processing device 100 illustrated in FIG. 1. Therefore, description of the hardware configuration of the personal identification device 300 will be omitted.

The personal identification device 300 is a device for identifying a person by collating biometric information of an identifying target such as a face image, a fingerprint image, and an iris image with biometric information registered in advance. The personal identification device 300 may include a device (such as a camera) for acquiring biometric information, and may operate in a standalone manner, or may acquire biometric information from another device in a personal identification system to identify the person. Further, the personal identification device 300 may be configured by a plurality of devices which are communicatively connected to each other.

The personal identification device 300 may be, for example, an authentication device for a face authentication gate. Alternatively, the personal identification device 300 may be an intelligent camera. The intelligent camera is an internet protocol (IP) camera or a network camera having an analysis function therein, and may be referred to as a smart camera.

The biometric information acquisition unit 302 is a device that acquires biometric information, and may be, for example, a digital camera capable of capturing a moving image. In the identification of the biometric information, a feature amount for matching may be extracted from an image or the like acquired by the biometric information acquisition unit 302. This feature amount extraction processing may be performed in the classification device 301, may be performed in the biometric information acquisition unit 302 at the time of acquiring the biometric information, or may be performed by another device. In this specification, the image or the like acquired by the biometric information acquisition unit 302 and the feature amount extracted therefrom may be collectively referred to as biometric information.

The biometric information storage unit 303 stores information necessary for processing in the classification device 301, such as biometric information of a registered person. The information processing device 100 of the first example embodiment is used as the classification device 301. The classification device 301 acquires the sequential data having elements that are the biometric information as the sequential data described in the first example embodiment. The classification device 301 refers to the information stored in the biometric information storage unit 303, and classifies the sequential data into one of a plurality of predetermined classes. Here, the plurality of classes may be, for example, classes each indicating a person who matches sequential data being input. Alternatively, the plurality of classes may be, for example, classes each indicating the presence or absence of spoofing. In other words, the plurality of classes may include, for example, a class indicating that a spoof exists in the input sequential data and a class indicating that a spoof does not exist in the input sequential data.

The personal identification device 300 of the present example embodiment includes a classification device 301 capable of accurately classifying sequential data. Thus, the personal identification device 300 capable of performing personal identification more appropriately is provided.

An example of spoofing detection will be described as an example in which the feature of the information processing device 100 of the first example embodiment that the classification accuracy of the sequential data is high is more utilized in the personal identification device 300 of the present example embodiment. As one of spoofing methods in biometric authentication such as face authentication, there is known a method using a non-living object such as a face photograph or a face model of a person. As a method of detecting such spoofing, there is a method in which a plurality of images are photographed, and when a difference between the plurality of images is small, it is determined that the image is not a living object. In the classification device 301 of the present example embodiment, a time-series image of a person to be authenticated is input as sequential data, and classification indicating presence or absence of spoofing of sequential data is performed using a difference between images as a feature amount, whereby spoofing can be detected. In this method, the temporal change of images included in input time-series data is very small, and the correlation between images is strong in many cases. Therefore, when classification for spoofing detection is performed, it is effective to use classification processing of the information processing device 100 according to the first example embodiment in which classification accuracy is less likely to deteriorate with respect to sequential data having strong relationship between elements.

The device or system described in the above embodiments can also be configured as in the following third example embodiment.

Third Example Embodiment

Figure 5:
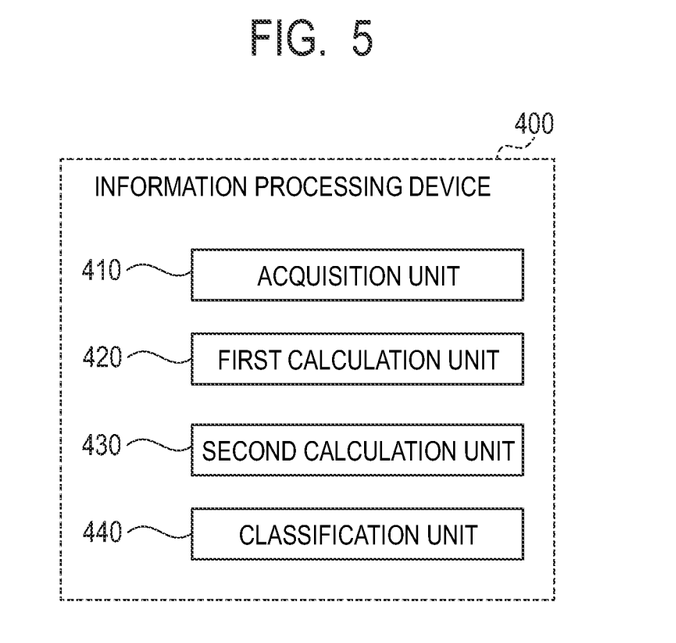
FIG. 5 is a functional block diagram of an information processing device according to a third example embodiment.

FIG. 5 is a functional block diagram of an information processing device 400 according to the third example embodiment. The information processing device 400 includes an acquisition unit 410, a first calculation unit 420, a second calculation unit 430, and a classification unit 440. The acquisition unit 410 sequentially acquires a plurality of elements included in sequential data. The first calculation unit 420 calculates, for each of the plurality of elements, indicators each indicating which of the a plurality of classes is appropriate for corresponding element to belong to, in consideration of two or more elements among the plurality of elements. The second calculation unit 430 calculates, by integrating the indicators of the plurality of elements, an integrated indicator indicating which of the plurality of classes is appropriate for the sequential data to belong to. The classification unit 440 classifies the sequential data into one of the classes based on the integrated indicator.

According to the present example embodiment, the information processing device 400 capable of accurately classifying sequential data is provided.

Modified Example Embodiments

The some non-limiting embodiments are not limited to the example embodiments described above, and may be suitably modified within the scope of the some non-limiting embodiments. For example, an example in which a part of the configuration of one embodiment is added to another embodiment or an example in which a part of the configuration of one embodiment is replaced with a part of the configuration of another embodiment is also an example embodiment of the some non-limiting embodiments.

The scope of each of the example embodiments also includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the computer program described above is stored but also the computer program itself. Further, one or two or more components included in the example embodiments described above may be a circuit such as an application specific integrated circuit (ASIC) and a field programmable gate array (FPGA), configured to implement the function of each component.

As the storage medium, for example, a floppy (registered trademark) disk, a hard disk, an optical disk, a magneto-optical disk, a compact disk (CD)-ROM, a magnetic tape, a nonvolatile memory card, or a ROM can be used. Further, the scope of each of the example embodiments includes an example that operates on operating system (OS) to perform a process in cooperation with another software or a function of an add-in board without being limited to an example that performs a process by an individual program stored in the storage medium.

Further, a service implemented by the function of each of the example embodiments described above may be provided to a user in a form of software as a service (SaaS).

It should be noted that the above-described embodiments are merely examples of embodying the some non-limiting embodiments, and the technical scope of the some non-limiting embodiments should not be limitedly interpreted by these. That is, the some non-limiting embodiments can be implemented in various forms without departing from the technical idea or the main features thereof.

The whole or part of the example embodiments disclosed above can be described as, but not limited to, the following supplementary notes.

(Supplementary Note 1)

An information processing device comprising:
  an acquisition unit that sequentially acquires a plurality of elements included in sequential data;
  a first calculation unit that calculates, for each of the plurality of elements, indicators each indicating which of a plurality of classes is appropriate for corresponding element to belong to, in consideration of two or more elements among the plurality of elements;
  a second calculation unit that calculates, by integrating the indicators of the plurality of elements, an integrated indicator indicating which of the plurality of classes is appropriate for the sequential data to belong to; and
  a classification unit that classifies the sequential data into one of the plurality of classes based on the integrated indicator.

(Supplementary Note 2)

The information processing device according to supplementary note 1, wherein each of the indicators includes a likelihood ratio indicating likelihood that corresponding one of the plurality of elements belongs to a certain one of the plurality of classes.

(Supplementary Note 3)

The information processing device according to supplementary note 1 or 2, wherein the integrated indicator includes an integrated likelihood ratio indicating likelihood that the sequential data belongs to a certain one of the plurality of classes.

(Supplementary Note 4)

The information processing device according to supplementary note 3, wherein when there is a class in which the integrated likelihood ratio exceeds a predetermined threshold, the classification unit classifies the sequential data into the class in which the integrated likelihood ratio exceeds the threshold.

(Supplementary Note 5)

The information processing device according to supplementary note 3 or 4, wherein when there is no class in which the integrated likelihood ratio exceeds a predetermined threshold, the classification unit does not classify the sequential data into any class, and the acquisition unit further acquires another element.

(Supplementary Note 6)

The information processing device according to any one of supplementary notes 3 to 5, wherein when there is no class in which the integrated likelihood ratio exceeds a predetermined threshold and the number of elements of the sequential data is greater than a predetermined value, the classification unit classifies the sequential data into one of the plurality of classes based on the integrated likelihood ratio.

(Supplementary Note 7)

The information processing device according to any one of supplementary notes 1 to 6,
  wherein the first calculation unit includes:
    a first storage unit that stores information processed in the past by the first calculation unit; and
    an indicator calculation unit that calculates each of the indicators based on the element and the information stored in the first storage unit when an element of the sequential data is acquired by the acquisition unit.

(Supplementary Note 8)

The information processing device according to supplementary note 7,
  wherein the second calculation unit includes:
    a second storage unit that stores the integrated indicator calculated in the past by the first calculation unit; and
    an integrated indicator calculation unit that calculates the integrated indicator by integrating the indicator output from the first calculation unit and the integrated indicator stored in the second storage unit.

(Supplementary Note 9)

The information processing device according to any one of supplementary notes 1 to 8, wherein the sequential data is time-series data.

(Supplementary Note 10)

A personal identification device comprising:
a biometric information acquisition unit that acquires biometric information on a target person; and
the information processing device according to any one of supplementary notes 1 to 9;
wherein the information processing device classifies the sequential data including the biometric information as the element into one of the plurality of classes.

(Supplementary Note 11)

The personal identification device according to supplementary note 10, wherein the information processing device classifies the sequential data into one of the plurality of classes indicating presence or absence of spoofing of the biometric information.

(Supplementary Note 12)

An information processing method comprising:
sequentially acquiring a plurality of elements included in sequential data;
calculating, for each of the plurality of elements, indicators each indicating which of a plurality of classes is appropriate for corresponding element to belong to, in consideration of two or more elements among the plurality of elements;
calculating, by integrating the indicators of the plurality of elements, an integrated indicator indicating which of the plurality of classes is appropriate for the sequential data to belong to; and
classifying the sequential data into one of the plurality of classes based on the integrated indicator.

(Supplementary Note 13)

A storage medium storing a program that causes a computer to perform an information processing method, the information processing method comprising:
sequentially acquiring a plurality of elements included in sequential data;
calculating, for each of the plurality of elements, indicators each indicating which of a plurality of classes is appropriate for corresponding element to belong to, in consideration of two or more elements among the plurality of elements;
calculating, by integrating the indicators of the plurality of elements, an integrated indicator indicating which of the plurality of classes is appropriate for the sequential data to belong to; and
classifying the sequential data into one of the plurality of classes based on the integrated indicator.

REFERENCE SIGNS LIST 100, 400 information processing device
101 processor
102 memory
103 storage
104 input and output I/F
105 communication I/F
110, 410 acquisition unit
120, 420 first calculation unit
121 indicator calculation unit
122 first storage unit
130, 430 second calculation unit
131 integrated indicator calculation unit
132 second storage unit
140, 440 classification unit
201 data acquisition device
202 input device
203 display device
300 personal identification device
301 classification device
302 biometric information acquisition unit
303 biometric information storage unit

The invention claimed is:

1. An information processing device comprising:
at least one memory storing instructions; and
at least one processor configured to execute the instructions to:
acquire one face image from a time-series image acquired by a camera;
calculate, for each of a plurality of face images included in the time-series image, a likelihood ratio indicating that the time-series image belongs to one of a plurality of classes indicating presence or absence of proofing, by using a difference between the one face image and another face image acquired from the time-series image before the one face image as a feature amount;
read out an integrated likelihood ratio calculated in a past from the at least one memory;
integrate the likelihood ratio with the integrated likelihood ratio calculated in the past by calculating a logarithm of the likelihood ratio using the integrated likelihood ratio calculated in the past, and calculate an updated integrated likelihood ratio indicating that the time-series image belongs to one of the plurality of classes indicating presence or absence of proofing; and
in order to control a face authentication gate, compare the updated integrated likelihood ratio with a threshold, and classify the entire time-series image to a corresponding class when the updated integrated likelihood ratio exceeds the threshold.

2. The information processing device according to claim 1, wherein the at least one processor calculates the likelihood ratio indicating the presence of proofing when the difference between the plurality of images is smaller than a predetermined value.

3. The information processing device according to claim 1, wherein the at least one processor determines presence or absence of proofing to perform biometric authentication of a target person.

4. The information processing device according to claim 1, wherein the time-series image includes a plurality of face images of a person.

5. A non-transitory storage medium storing a program executable by a computer to perform an information processing method comprising:
acquiring one face image from a time-series image acquired by a camera;
calculating, for each of a plurality of face images included in the time-series image, a likelihood ratio indicating that the time-series image belongs to one of a plurality of classes indicating presence or absence of proofing, by using a difference between the one face image and another face image acquired from the time-series image before the one face image as a feature amount;
reading out an integrated likelihood ratio calculated in a past from a memory;
integrating the likelihood ratio with the integrated likelihood ratio calculated in the past by calculating a logarithm of the likelihood ratio using the integrated likelihood ratio calculated in the past, and calculate an updated integrated likelihood ratio indicating that the time-series image belongs to one of the plurality of classes indicating presence or absence of proofing; and
in order to control a face authentication gate, comparing the updated integrated likelihood ratio with a threshold, and classify the entire time-series image to a corresponding class when the updated integrated likelihood ratio exceeds the threshold.

6. An information processing system comprising:

a camera;

a face authentication gate;

at least one memory storing store instructions; and at least one processor configured to execute the instructions to:

acquire one face image from a time-series image acquired by the camera;

calculate, for each of a plurality of face images included in the time-series image, a likelihood ratio indicating that the time-series image belongs to one of a plurality of classes indicating presence or absence of proofing, by using a difference between the one face image and another face image acquired from the time-series image before the one face image as a feature amount;

read out an integrated likelihood ratio calculated in a past from the memory;

integrate the likelihood ratio with the integrated likelihood ratio calculated in the past by calculating a logarithm of the likelihood ratio using the integrated likelihood ratio calculated in the past, and calculate an updated integrated likelihood ratio indicating that the time-series image belongs to one of the plurality of classes indicating presence or absence of proofing;

in order to control the face authentication gate, compare the updated integrated likelihood ratio with a threshold, and classify the entire time-series image to a corresponding class when the updated integrated likelihood ratio exceeds the threshold; and classify the time-series image to one of the plurality of classes based on the updated integrated likelihood ratio when there is no class in which the updated integrated likelihood ratio exceeds the threshold and a number of the face images acquired from the time-series image is greater than a predetermined value, wherein the face authentication gate is controlled based on a result of classification.

7. The information processing system according to claim 6, wherein the at least one processor calculates the likelihood ratio indicating the presence of proofing when the difference between the plurality of images is smaller than a predetermined value.

8. The information processing system according to claim 6, wherein the at least one processor determines presence or absence of proofing to perform biometric authentication of a target person.

9. The information processing system according to claim 6, wherein the time-series image includes a plurality of face images of a person.

* * * * *